US008625107B2

(12) United States Patent
Kusik et al.

(10) Patent No.: US 8,625,107 B2
(45) Date of Patent: Jan. 7, 2014

(54) TARGET FOR MOTION TRACKING SYSTEM (75) Inventors: Todd P. Kusik, Wauwatosa, WI (US);
Brian S. R. Armstrong, Shorewood, WI (US); Robert T. Barrows, Wauwatosa, WI (US); Ethan V. Munson, Milwaukee, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 313 days.

(21) Appl. No.: 13/111,434

(22) Filed: May 19, 2011

(65) Prior Publication Data
US 2011/0286010 A1 Nov. 24, 2011

Related U.S. Application Data

(60) Provisional application No. 61/346,277, filed on May 19, 2010.

(51) Int. Cl.
*G01B 11/14* (2006.01)
(52) U.S. Cl.
USPC .......................................................... 356/614
(58) Field of Classification Search
USPC .......................................................... 356/614
See application file for complete search history.

(56) References Cited

U.S. PATENT DOCUMENTS

| 5,936,722 | A | 8/1999 | Armstrong et al. |
| 5,936,723 | A * | 8/1999 | Schmidt et al. ............. 356/152.3 |
| 6,384,908 | B1 * | 5/2002 | Schmidt et al. ............. 356/152.3 |
| 7,206,059 | B2 * | 4/2007 | Flagello et al. ................. 355/71 |
| 7,304,719 | B2 * | 12/2007 | Albert et al. ..................... 355/71 |
| 8,059,267 | B2 * | 11/2011 | Armstrong ................... 356/152.3 |
| 2004/0233461 | A1 * | 11/2004 | Armstrong et al. ........... 356/620 |
| 2005/0069089 | A1 * | 3/2005 | Armstrong et al. ........... 378/162 |
| 2007/0258560 | A1 * | 11/2007 | Armstrong et al. ............. 378/21 |
| 2007/0280508 | A1 | 12/2007 | Ernst et al. |
| 2010/0046857 | A1 * | 2/2010 | Armstrong .................... 382/293 |

FOREIGN PATENT DOCUMENTS

WO 0135052 A1 5/2001

OTHER PUBLICATIONS

The Metria Innovations Technologies, "Description of Markets and Applications of Metria Innovations Technologies," dated Jul. 8, 2008 (52 pages).
Armstrong, B.S.R. et al. "Performance of stereo vision and retrograte reflector motion tracking systems in the space constraints of an MR scanner," (2009) ISMRM. Proceedings ISMRM 17th Scientific Meeting and Exhibition. E-Poster 4641, 1 page.
Armstrong, B.S.R. "Optical Markers and Detection Accuracy," (2010) ISMRM. Current Concepts in Motion Correction for MRI & MRS, 7 pages.

* cited by examiner

*Primary Examiner* — Roy M Punnoose
(74) *Attorney, Agent, or Firm* — Michael Best & Friedrich LLP (57) ABSTRACT

A target for use in a motion tracking system includes an optically transparent substrate with front and rear artwork. A robust landmark is comprised of portions of the front and rear artwork, and includes alternating spokes and interstitial spaces. The front and rear artwork also define orientation dependent radiation regions that occupy a portion of the interstitial spaces. The artwork also provides target identification markings and markings for providing in-plane rotation information. The surface area of the robust landmark maximized with respect to the total surface area of the target size.

28 Claims, 4 Drawing Sheets

TARGET FOR MOTION TRACKING SYSTEM

CROSS-REFERENCE TO RELATED APPLICATIONS

This application claims the right of priority under 35 U.S.C. 119(e)(1) to U.S. Provisional Patent Application No. 61/346,277 filed May 19, 2010.

STATEMENT REGARDING FEDERALLY SPONSORED RESEARCH OR DEVELOPMENT

This invention is made with government support under contract number R01-DA021146-02 awarded by the National Institute of Health. The government has certain rights in the invention.

BACKGROUND

The present invention is directed to apparatus and methods for producing a orientation-dependant radiation (ODR) source for use in systems employing such methods and apparatus. Specifically, the invention relates to an optical target for use with image metrology technology for precision spatial measurement and image-based motion analysis.

The invention relates to new technology that allows for 3-D motion capture using a single camera. Prior patents that generally disclose the basic concepts include U.S. Pat. Nos. 5,936,722; 5,936,723; and 6,384,908, and U.S. Patent Application Publication Nos. 2010/00046857; 2007/0280508; and 2004/0233461, which are all incorporated herein by reference in their entirety.

U.S. Pub. No. 2010/00046857 discloses a target constructed by applying artwork on the front and back of a transparent substrate, such as a glass or plastic plate. The target enables of six-degree of freedom location of an object by way of a single camera. The x and y location is determined by the position of a landmark that can be readily detected, even in an uncontrolled scene. Such a landmark is commonly called a robust landmark. The robust landmark can be a starburst in the center of the target, as in FIGS. 9-11 of U.S. Pub. No. 2010/00046857. The starburst may be black or white. The z location is determined by the spacing of the four circles (also referred to as secondary landmarks) from the center of the starburst, along with other data.

The target disclosed in U.S. Pub. No. 2010/00046857 is a three-layer structure of substrate, front artwork, and rear artwork. The regions that extend radially outward from the starburst and between the secondary landmarks (i.e., the regions labeled 311a-316b in FIGS. 9-11) are grating regions that produce moiré patterns. The moiré patterns are seen as light and dark fringes that change in response to changes in orientation of the target. Small rotations produce moiré-pattern displacements that are visible to the eye. With the out-of-plane rotations revealed by the moiré patterns, the system is able to determine the six degree of freedom ("6-DOF") pose of the target from a single camera image.

SUMMARY

In one embodiment, the invention provides a target for use in a system for optical tracking of motion of an object to which the target is affixed, the target comprising: an optically transparent substrate having a front surface and a rear surface; front artwork applied to the front surface of the substrate; rear artwork applied to the rear surface of the substrate; a robust landmark comprising of an image of the front and rear artwork, the robust landmark including a circular border defining an area of the robust landmark, and alternating spokes and interstitial spaces within the circular border; and orientation dependent radiation regions occupying at least a portion of the interstitial spaces of the robust landmark.

In some embodiments, the orientation dependent radiation regions extend radially outside of the robust landmark. In some embodiments, the spokes and interstitial spaces are generally wedge-shaped. In some embodiments, the spokes are defined by a first feature in the front artwork and a second feature in the back artwork. In some embodiments, the first feature comprises a radial-edge boundary and the second feature comprises a circumferential-edge boundary.

In another embodiment, the invention provides a target comprising: an optically transparent substrate; an orientation dependent radiation region positioned on the substrate; a robust landmark positioned on the substrate; and at least one target identification marking that is rotationally oriented relative to the target in order to provide in-plane rotation information.

In some embodiments, the orientation dependent radiation region comprises two orientation dependent radiation regions, and the target identification marking is positioned between the two orientation dependent radiation regions. In some embodiments, the target identification marking is positioned outside of the robust landmark and circumferentially between the orientation dependent radiation regions. In some embodiments, the robust landmark includes a spoke, and the target identification marking is positioned radially outward from the spoke. In some embodiments, the target identification marking comprises a plurality of markings that provide multi-bit identification. In some embodiments, the target identification marking comprises sixteen possible markings that provide 16-bit identification.

In another embodiment, the invention provides a target comprising: a substrate having a total area; an orientation dependent radiation region positioned on the substrate; and a robust landmark positioned on the substrate, the robust landmark having a landmark area that is at least 10% of the total area. In some embodiments, the landmark area is at least 20%, 30%, or 47% of the total area.

In another embodiment, the invention provides a target comprising: a substrate having a substrate width; an orientation dependent radiation region positioned on the substrate; and a robust landmark on the substrate, the robust landmark having a landmark width; wherein the landmark width is at least 36% of the substrate width. In some embodiments, the landmark width is at least 50%, 60%, or 77.5% of the substrate width.

In another embodiment, the invention provides a target comprising: a substrate having a substrate width; an orientation dependent radiation region positioned on the substrate, the orientation dependent radiation region having an ODR area; and a robust landmark on the substrate, the robust landmark occupying a landmark area; wherein the landmark area is at least 20% of the ODR area. In other embodiments, the landmark area is at least 40%, 80% or 120% of the ODR area.

In another embodiment, the invention provides a target comprising: a substrate; and orientation dependent radiation regions positioned on the substrate; wherein the orientation dependent radiation regions are generally wedge-shaped.

In some embodiments, the target further comprises a robust landmark that includes spokes that define a center of the target; wherein the orientation dependent radiation regions are spaced circumferentially relative to the center. In some embodiments, the orientation dependent radiation regions extend radially further than the spokes of the robust landmark. In some embodiments, the spokes are generally wedge-shaped.

In another embodiment, the invention provides a target for use in a system for optical tracking of motion of an object to which the target is affixed, the target comprising: an optically transparent substrate having a front surface and a rear surface, both the front surface and rear surface being parallel to a plane; front artwork applied to the front surface of the substrate; rear artwork applied to the rear surface of the substrate; and a robust landmark comprising an image of the front and rear artwork; wherein portions of the front artwork and rear artwork included in the robust landmark appear to move with respect to each other in an image of the target having been tilted about an axis within the plane, such that a direction of tilt of the target can be determined from the apparent relative movement of the portions of the front artwork and rear artwork.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
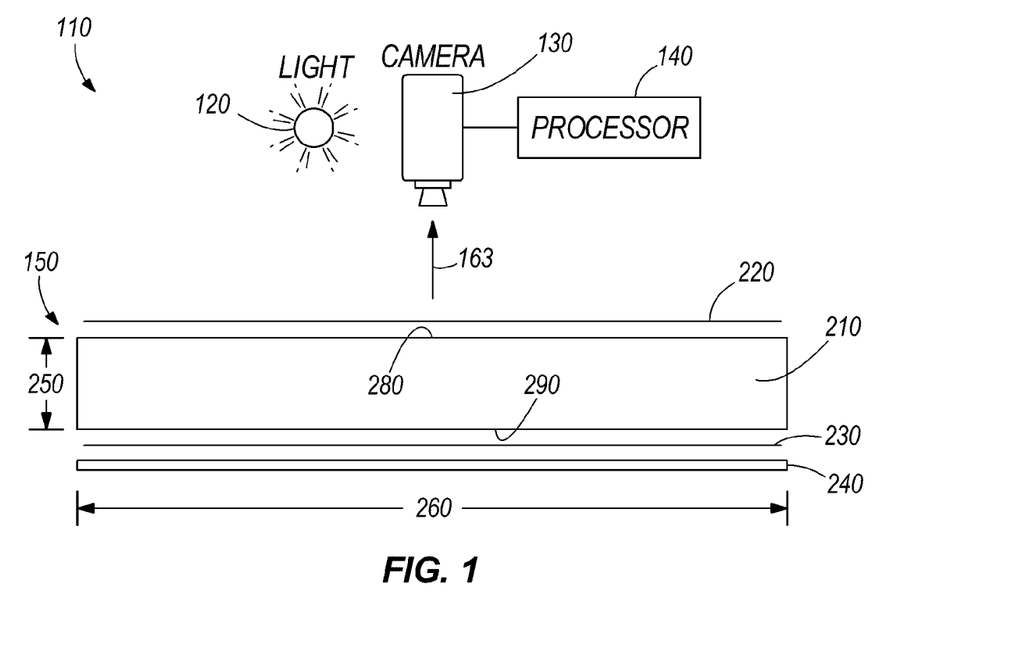
FIG. 1 is a side schematic view of a target according to the present invention.

FIG. 1 illustrates system 110 for tracking and determining spatial position of an object. The system 110 includes a source of light 120, a camera 130, a processor 140, and a target 150. The camera 130 captures images of light from the source of light 120 reflected from the target 150 and feeds the images to the processor 140. The processor 140 processes the images and calculates, based on the pattern of light reflected by the target 150, the position and attitude of the object to which the target 150 is affixed.

Figure 2:
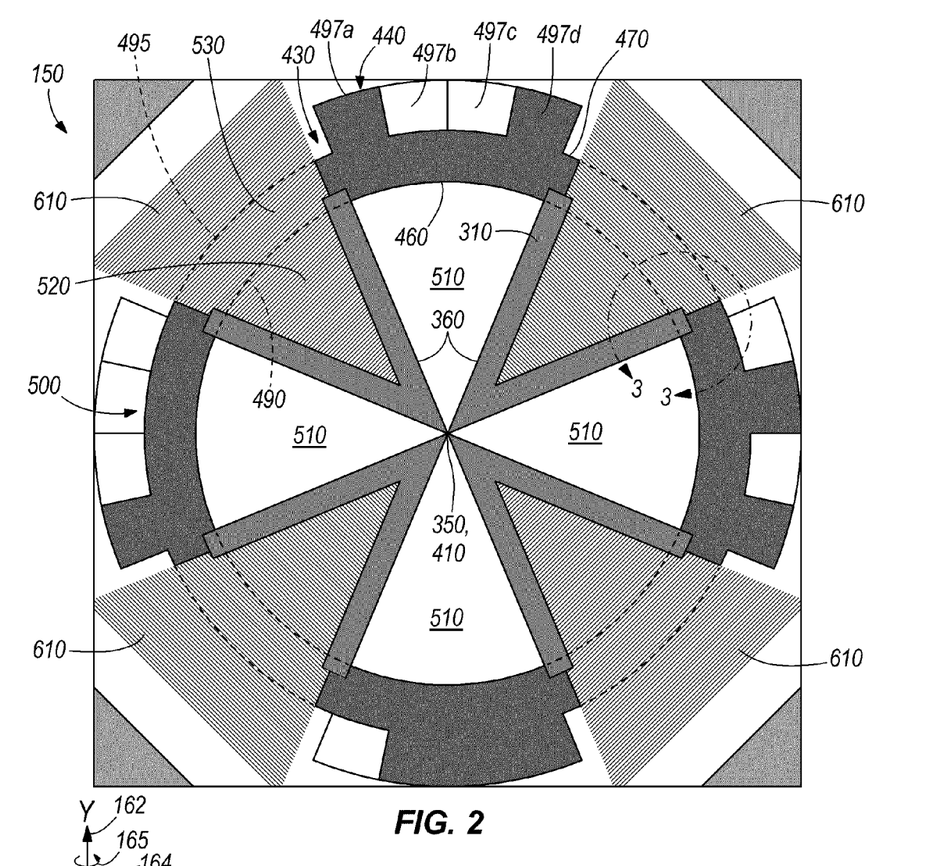
FIG. 2 is a front view of a target according to the present invention.

With reference to the legend of FIG. 2, which illustrates an exemplary target 150 viewed from the front, the target 150 has six degrees of freedom ("6-DOF") in which it can move and be tracked within the system 110. Consequently, an object to which the target 150 is affixed can be tracked in 6-DOF. The six degrees of freedom consist of translation along an x-axis 161, translation along a y-axis 162, translation along a z-axis 163 (extending out of the page in FIG. 2, perpendicular to both the x-axis 161 and the y-axis 162—see FIG. 1), pitch 164 (i.e., rotation about the x-axis 161), yaw 165 (i.e., rotation about the y-axis 162), and roll 166 (i.e., rotation about the z-axis 163).

In this specification, motion is deemed "in plane" to the extent it includes translation or rotation of the target 150 within the plane defined by the x-axis 161 and y-axis 162, and motion is deemed "out of plane" to the extent it includes translation or rotation of the target 150 out of the plane defined by the x-axis 161 and y-axis 162. "In-plane motion" includes translation along the x-axis 161, translation along the y-axis 162, and roll 166. "Out-of-plane motion" includes translation along the z-axis 163, pitch 164, and yaw 165.

Target Assembly

The target 150 illustrated in FIG. 1 includes a optically transparent substrate 210, a front artwork 220 (illustrated in FIG. 4), a rear artwork 230 (illustrated in FIG. 5), and a retro-reflective film 240. The optically transparent substrate 210 may be glass, plastic, or any other substrate through which light may penetrate. The substrate 210 provides rigid support for the front artwork 220, rear artwork 230, and retro-reflective film 240. The substrate 210 has a thickness or depth 250, a width 260, and a length (measured into the page), and includes a front surface 280 and a rear surface 290. The front surface 280 and rear surface 290 are planar and parallel to each other, and are each parallel to the x-axis 161 and the y-axis 162.

The front artwork 220 (illustrated in FIG. 4) is applied to the front surface 280 of the substrate 210 and the rear artwork 230 (illustrated in FIG. 5) is applied to the rear surface 290 of the substrate 210. The front artwork 220 and the rear artwork 230 may in some embodiments be films that are separate from the substrate 210 and are bonded to the respective front surface 280 and rear surface 290. In other embodiments, the front artwork 220 and the rear artwork 230 may be applied by other techniques, such as being printed directly onto the respective front surface 280 and rear surfaces 290 of the substrate 210.

Figure 4:
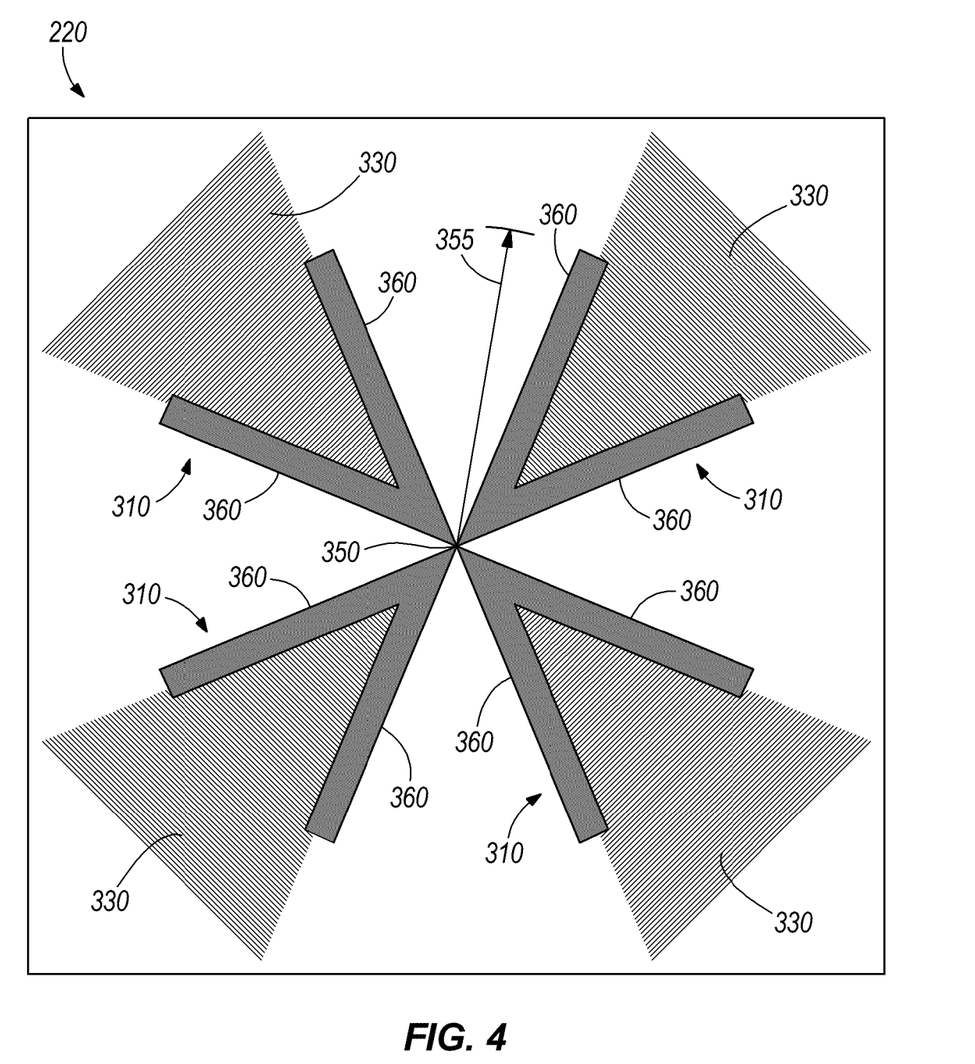
FIG. 4 is a front view of the image applied to the front surface of the target of FIG. 2.

With reference to FIG. 4, the front artwork 220 includes a plurality of v-shaped portions 310 and a plurality of front grated portions 330. The front artwork 220 is symmetrically arranged about a front center point 350. The apexes of the v-shaped portions 310 meet at the front center point 350 and extend radially from the front center point 350 a radial distance 355. The v-shaped portions 310 define edges 360 that border open areas (illustrated as white in FIG. 4) between the v-shaped portions 310.

The front grated portions 330 occupy the entire space within a v-shaped portion 310 and extend radially out of the v-shaped portions 310. The front grated portions 330 are generally triangular with a step-up in width at the radial distance 355 (i.e., at the end of the v-shaped portions 310). The apexes of the triangle shapes of the front grated portions 330 point toward the front center point 350. The front grated portions 330 include alternating tangential lines and openings. As used in this specification, "tangential" means that the lines and openings are perpendicular to a radius originating at the front center point 350.

Figure 5:
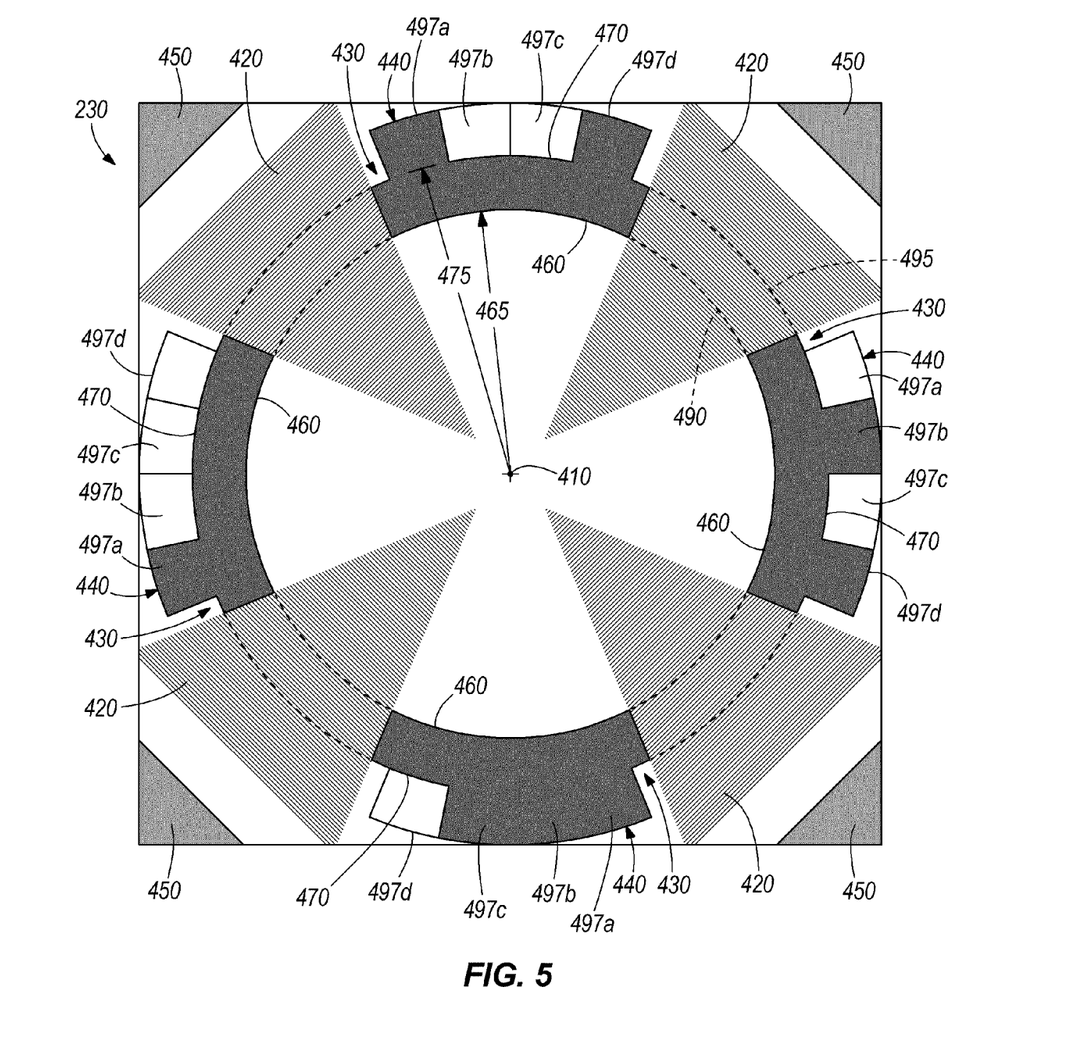
FIG. 5 is a front view of the image applied to the back surface of the target of FIG. 2.

With reference to FIG. 5, the rear artwork 230 includes a rear center point 410, a plurality of rear grated portions 420, border regions 430, encoding regions 440, and secondary landmarks 450. The rear artwork 230 is symmetrically arranged about a rear center point 410. The rear grated portions 420 are triangular, with the apexes of the triangle shapes pointing toward the rear center point 410.

Figure 3:
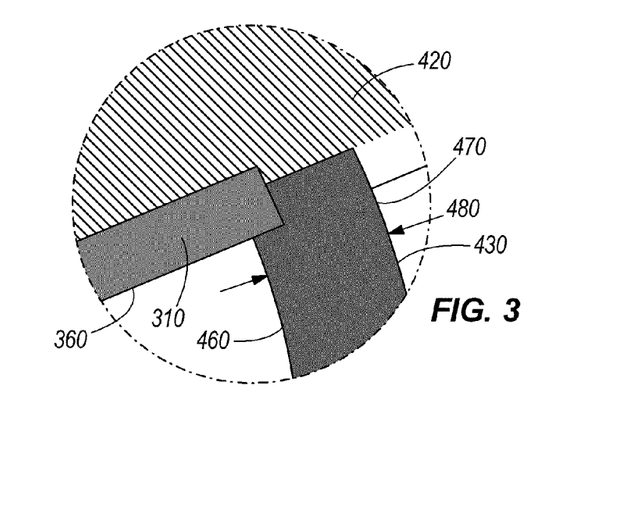
FIG. 3 is a greatly enlarged view of a portion of the target of FIG. 2.

The border regions 430 are arcs that extend between the rear grated portions 420, and define an inner edge 460 at an inner radius 465 (measured from the rear center point 410) and an outer edge 470 at an outer radius 475 (also measured from the rear center point 410). The border regions 430 include a radial width 480 (FIG. 3) between the inner edge 460 and the outer edge 470. The inner edges 460 of the border regions 430 together define an imaginary inner landmark circle 490, and the outer edges 470 together define an imaginary outer landmark circle 495. As will be discussed in greater detail below, the outer landmark circle 495 defines an outer edge of a robust landmark within the target 150, and the apparent shape and attitude of the inner landmark circle 490 in an image of the target 150 can be used for estimation of degree of out-of-plane tilt of the target 150.

The encoding regions 440 are arranged along the outer edge 470 of each border region 430. Each encoding region 440 includes four encoding segments 497a, 497b, 497c, 497d. The encoding segments 497a, 497b, 497c, 497d generate a binary code, with each encoding segment 497a, 497b, 497c, 497d having a low density (e.g., a "1") or a high density (e.g., a "0") and therefore appearing light or dark in an image of the target 150. Taken together, the four encoding regions 440 provide sixteen encoding segments 497a, 497b, 497c, 497d, which can be used in a number of ways according to known encoding theory to provide 16-bit encoding of the target 150. As discussed below in more detail, such 16-bit encoding can be used to uniquely identify the target 150 and establish a datum within the target 150 for estimation of target roll. More specifically, four of the encoding segments 497a, 497b, 497c, 497c may provide target identification markings that are rotationally oriented relative to the target 150 in order to provide in-plane rotation (i.e., roll 166) information, and the remaining twelve encoding segments may provide a unique identifier of the target 150.

The secondary landmarks 450 are illustrated as dark (e.g., black) triangles in the corners of the rear artwork 230. It is desirable to position the secondary landmarks 450 as far from the rear center point 410 as possible to increase the accuracy with which the distance of the secondary landmarks 450 from the center point 410 can be measured. As will be discussed below in more detail, the apparent distance of the secondary landmarks 450 from the center point 410 in an image of the target 150 can be used to estimate distance of the target 150 from the camera 130 along the z-axis 163.

The retro-reflective film 240 is bonded or attached on the rear surface 290 to efficiently return light from the light source 120 to the camera 130. The terms retro-reflective film and retro-reflector means a device or surface that reflects light back to the light source 120 with a minimum scattering of light. A retro-reflector is distinguished from a planar mirror which reflects light at an angle equal to the angle of incidence; a planar mirror will only reflect light back to its source in the manner of a retro-reflector when the angle of incidence is zero.

The target 150 illustrated in FIG. 1 is a four-layer structure (front artwork 220, substrate 210, rear artwork 230, retroreflective layer 240). In other embodiments, backlighting can be used in the place of the retro-reflective film 240. This would result in a three-layer structure in which there is no retro-reflective film 240 and the target 150 is illuminated from the rear surface 290, so that the camera 130 receives light shining through the target 150. As will be described in more detail below, the target 150 includes grating regions that create moiré patterns as the target 150 is tilted. The combination of the retro-reflective film 240 and such grating regions give rise to the name "retro-grate reflective target" or "RGR target," which is one type of target 150 in which the present invention may be embodied. The backlit, three-layer structure without the retro-reflective film 240 is another type of target 150 in which the present invention can be embodied.

An image of the target 150 taken by the camera 130 is a composite of the front artwork 220 and the rear artwork 230. As the target 150 moves around in-plane and out-of-plane, the image of the target 150 captured by the camera 130 changes, as will be discussed below. The processor 140 includes an algorithm for measuring certain aspects of the image of the target 150 to calculate absolute or relative positioning and attitude of the target 150. The white regions in the front artwork 220 and rear artwork 230 are open regions that permit light to pass through, and the darker regions block light. The image captured by the camera 130 receives light either through the open regions from backlighting (in the three-layer embodiment) or light reflected off the back retro-reflective film 240 (in the four-layer embodiment).

With reference to FIG. 2, to provide positional and attitudinal information about the target 150, an image of the illustrate target 150 includes five elements: (i) a robust landmark; (ii) an orientation dependent radiation source; (iii) a cosine disambiguation feature; (iv) secondary landmarks; (v) and a unique identifier. These elements of an image of the target 150 are provided by the appearance of the various aspects of the front artwork 220 and rear artwork 230 from the perspective of the camera 130. One aspect of the present invention is arranging the front artwork 220 and rear artwork 230 in the smallest possible target 150 that still satisfies these five elements, and in particular maximizes the size of the robust landmark with respect to the overall size of the target 150.

Robust Landmark

The illustrated robust landmark 500 is of the starburst variety and occupies the area within the outer landmark circle 495. The area of the robust landmark 500 is the area within the outer landmark circle 495. With reference to FIG. 2, the robust landmark 500 includes three elements: spokes 510, interstitial spaces 520, and a border 530. The robust landmark 500 is centered on the front center point 350. When viewed along the z-axis 163 (i.e., directly from the front), the front center point 350 is in front of the rear center point 410. The front center point 350 and rear center point 410 define the z-axis 163.

The spokes 510 and the interstitial spaces 520 are centered on and symmetrical about the front center point 350. The spokes 510 and interstitial spaces 520 are identical, pie-shaped regions that are bounded on their sides by the edges 360 of the v-shaped portions 310 and at their radial perimeter by the inner landmark circle 490. The spokes 510 and interstitial spaces 520 alternate and evenly divide the area of the inner landmark circle 490. Each spoke 510 has adjacent interstitial spaces 520 on either side, and each interstitial space 520 has adjacent spokes 510 on either side. There are an equal number of spokes 510 and interstitial spaces 520. In the illustrated embodiment there are four of each, but in other embodiments there may be more or fewer.

The spokes 510 in the illustrated embodiment are the white regions bounded by the edges 360 and the inner edge 460 of the border regions 430. The interstitial spaces 520 are a composite of the portions of the v-shaped portions 310, front grated portions 330, and rear grated portions 420 that extend into the inner landmark circle 490. Stated another way, the interstitial spaces 520 include all portions of the robust landmark 500 within the inner landmark circle 490 and between the spokes 510. The border 530 is annular or ring-shaped and occupies the space between the inner landmark circle 490 and the outer landmark circle 495. The border 530 is a composite of the border regions 430 and those portions of the v-shaped portions 310, front grated portions 330, and rear grated portions 420 between the inner landmark circle 490 and outer landmark circle 495.

The spokes 510 have a first density, the interstitial spaces 520 have a second density, and the border 530 has a third density. The term "density," as used in this specification, refers to the darkness of the area. The first density is different from the second and third densities. The second and third densities may be different from each other or in other embodiments can be equal. Both the interstitial spaces 520 and the border 530 include portions of the front grated portions 330 and rear grated portions 420. The front grated portions 330 and rear grated portions 420 generate moiré patterns which shift as the target 150 is tilted. As a result, both the interstitial spaces 520 and border 530 include portions of moiré patterns which have variable densities. The border 530 has a constant density outside of the spokes 510 (owing to the border regions 430) and a variable density outside of the interstitial spaces 520 (owing to the moiré patterns). The interstitial spaces 520 has constant density alongside the spokes 510 (owing to the v-shaped portions 310) and variable density in the middle where the interstitial spaces 520 do not bound the spokes 510 (owing to the moiré patterns).

The robust landmark 500 is characterized by being readily detected under given conditions. The term "robust landmark" is used in this specification consistently with the definition of robust landmarks provided on page 92 of PCT Application Publication No. WO/2001/035052, published May 17, 2001. That application provides: "In particular, one embodiment of the invention is directed generally to robust landmarks for machine vision (and, more specifically, robust fiducial marks in the context of image metrology applications), and methods for detecting such marks. For purposes of this disclosure, as discussed above, a 'robust' mark generally refers to an object whose image has one or more detectable properties that do not change as a function of viewing angle, various camera settings, different lighting conditions, etc. In particular, according to one aspect of this embodiment, the image of a robust mark has an invariance with respect to scale or tilt; stated differently, a robust mark has one or more unique detectable properties in an image that do not change as a function of the size of the mark as it appears in the image, and/or an orientation (rotation) and position (translation) of the mark with respect to a camera (i.e., a viewing angle of the mark) as an image of a scene containing the mark is obtained. In other aspects, a robust mark preferably has one or more invariant characteristics that are relatively simple to detect in an image, that are unlikely to occur by chance in a given scene, and that are relatively unaffected by different types of general image content. These properties generally facilitate automatic identification of the mark under a wide variety of imaging conditions."

In operation, the target 150 is moved with 6-DOF. Because of the depth 250 of the substrate 210, the front artwork 220 and rear artwork 230 appear to move with respect to each other during out-of-plane movement. The operating parameters of the system 110 dictate how much out-of-plane movement must be accommodated by the geometry of the front artwork 220 and rear artwork 230. To accommodate any out-of-plane movement, the v-shaped portions 310 must extend beyond the inner landmark circle 490 to accommodate apparent shifting of the border regions 430 while still maintaining an edge 360 that reaches all the way to the inner edge 460 so that the spokes 510 are clearly defined. This is why the v-shaped portions 310 extend into the border regions 430 when the target 150 is viewed from the front (as in FIG. 2). The over-extension of the v-shaped portions 310 accommodates apparent shortening of the edges 360 in an image of the target 150 when the target 150 has been tilted out-of-plane.

With respect to the "minor dimension" requirement, upon out-of-plane tilting (i.e., pitch 164 and yaw 165) of the robust landmark 500, the inner landmark circle 490 will appear in the image as an ellipse. As an example, if the performance requirements for a given system 110 are to track the target up to 60° of out-of-plane tilt 164, then the robust landmark 500 must have an inner landmark circle 490 with a 12 pixel diameter in the image taken by the camera 130. If tilted 60°, the inner landmark circle 490 will appear as an ellipse with a minor dimension of 6 pixels (the cosine of 60° is 0.5, so the minor dimension will appear as half of the in-plane dimension).

For a readily detectable robust landmark 500, the setup for tracking a target will be determined by the following several factors: measurement volume, camera resolution, and robust landmark size. Measurement volume is the area of an image captured by the camera and a depth which is determined by the focus of the camera. When tracking a target such as the target 150 described in this specification, the camera focus is typically fixed at setup to define a measurement volume, and the focus remains fixed during tracking of the target.

The interplay of measurement volume, camera resolution, and robust landmark size is as follows. For a given measurement volume, the resolution of the camera can be decreased as the size of the robust landmark increases. For a given camera resolution, the measurement volume may be increased as the size of the robust landmark increases. For a given robust landmark size, the measurement volume may be increased as the resolution of the camera increases.

The most expensive component of the target tracking system 110 is typically the camera 130, and the cost of the camera 130 is driven in large part by its resolution. Assuming that the cost of the camera 130 is an important factor when setting up the target tracking system 110, and assuming that it is desirable to maximize the measurement volume capability of the system 110, then it is also desirable to maximize the size of the robust landmark 500. The size of the robust landmark 500 is necessarily limited by the physical size of the substrate 210 of the target 150, and there are practical limitations on how large a target 150 can be for a given target tracking system 110 (such limitations depending in part on environment and the size of the object to which the target 150 is attached). It is therefore desirable to maximize the size of the robust landmark 500 in a given target 150.

For human motion analysis applications, it is desirable to have a large measurement volume, combined with unintrusive motion-tracking targets, while operating with moderate-cost, high frame rate cameras. Such applications would therefore find it desirable to provide a small target 150 having a large robust landmark 500.

For motion tracking with an MR scanner, the target size is at a premium, because of restricted space within the scanner. For a given measurement volume and camera resolution in such application, the lower size limit of the target 150 will be dictated by the ratio of the size of the robust landmark 500 to the overall size of the target 150.

Orientation Dependent Radiation Source

The front gratings 330 and rear gratings 420 are one example of a larger classification of features termed orientation dependent radiation ("ODR") sources. For convenience, the combined front gratings 330 and rear gratings 420 (which appear in combination only in FIG. 2) will be referred to in this specification as the ODR regions 610. ODR regions 610 produce radiation (e.g., light waves, as in the illustrated embodiment) in a shape or pattern that can be interpreted by the processor 140 to refine an approximate estimate of out-of-plane tilt (i.e., pitch 164 and yaw 165) of the target 150 and produce a precise estimate of out-of-plane tilt. In the illustrated embodiment, the front gratings 330 and rear gratings 420 filter radiation in the form of light that is either reflected (if the target 150 is a four-layer assembly with a retro-reflective layer 240) or directly shone through the rear gratings 420 and front gratings 330 (if a three-layer assembly that is backlit), to form moiré patterns in the ODR regions 610 that appear in an image of the target 150. The front and rear gratings are designed such that the moiré patterns will have brightness no more than half the brightness of the spokes 510 in an image of the target 150.

The ODR regions 610 extend into and occupy a portion of the interstitial spaces 520 and border 530 of the robust landmark 500 and also extend radially outwardly beyond the robust landmark 500 (i.e., beyond the outer landmark circle 495). Extending the ODR regions 610 into the robust landmark 500 permits the overall target 150 size to be reduced without reducing the size of the robust landmark 500. To properly extract out-of-plane tilting information from the moiré patterns, the ODR regions 610 must have a size that permits several cycles of the moiré patterns to be analyzed from the image of the target 150. A minimum physical dimension of the ODR regions 610 is achieved in the embodiment illustrated in FIG. 2. The ratio of robust landmark 500 area to the overall area of the target 150 is one advantage of the present invention, as prior art targets have been arranged with no overlap of the ODR regions and the robust landmark (see for example the arrangement in FIGS. 9-11 of U.S. Pub. No. 2010/00046857). The ODR regions in the prior art have been entirely outside of the robust landmark.

Cosine Disambiguation Feature

As discussed in U.S. Pub. No. 2010/00046857, paragraphs [0015]-[0017], the front artwork 220 and rear artwork 230 will undergo foreshortening along an axis of out-of-plane tilting of the target 150. However, the front artwork 220 and rear artwork 230 will have essentially the same appearance whether the angle of tilting is positive or negative. The direction or branch of such out-of-plane tilting, is therefore ambiguous based on the front artwork 220 and rear artwork 230 individually. This is called cosine ambiguity. The observation of the apparent relative movement of the front artwork 220 and rear artwork 230 can be used to resolve such cosine ambiguity.

Because the front artwork 220 and rear artwork 230 exist in parallel planes that are separated by the depth 250 of the substrate 210, the front artwork 220 will appear to shift with respect to the rear artwork 230 as the target 150 is tilted out-of-plane. More specifically, the v-shaped portions 310 of the front artwork 220 and the border regions 430 of the rear artwork 230 will appear to shift with respect to each other. This apparent shifting causes an apparent shift of the inner edge 460 of the border regions 430 with respect to the center point 350, and a resultant apparent lengthening or shortening of the edges 360 of the v-shaped portions 310. Since the edges 360 define the boundaries of the spokes 510, the spokes 510 will appear to lengthen and shorten depending on the direction of tilt.

For example, pitch 164 in the positive direction (i.e., the direction of rotation for pitch 164 indicated in FIG. 2, which follows the right hand rule) will cause an apparent shortening (sometimes referred to as "foreshortening") of the edges 360 of the top spoke 510 (i.e., the spoke 510 at twelve o'clock in FIG. 2) and a lengthening of the edges 360 of the bottom spoke 510 (i.e., the spoke 510 at six o'clock in FIG. 2).

The aspects of the front artwork 220 and rear artwork 230 that can be used to determine the direction of out-of-plane tilt of the target 150 may be referred to as a cosine disambiguation feature of the target 150. In the illustrated target 150, the cosine disambiguation feature is the combination of the v-shaped portions 310 in the front artwork 220 and the border regions 430 in the rear artwork 230.

Secondary Landmarks

The secondary landmarks are used to measure the distance of the target 150 from the camera 130 (i.e., the distance of the target 150 in the z-direction 163). More specifically, assuming that degree and direction of out-of-plane tilt of the target 150 is known, the distance of the center 350 target 150 from the camera 130 will be indicated by the apparent distances between the several secondary landmarks 450 in an image of the target 150. For a given degree and direction of out-of-plane tilt of the target, the closer the secondary landmarks 450 appear to each other in the image, the further the target 150 is from the camera 130.

The secondary landmarks 450 should be positioned as far from the center point 350 as possible, within the physical confines of the target size. Wider separation of the secondary landmarks 450 provides the opportunity for more fine measurement of distances. In the illustrated embodiment, the secondary landmarks 450 are the black triangles in the four corners of the target 150. The secondary landmarks 450 are not required to be robust.

Unique Identifier

The unique identifier in the illustrated embodiment is provided by the encoding sixteen encoding segments 497a, 497b, 497c, 497d in the four encoding regions 440. The first encoding segment 497a (counter-clockwise-most position) of each encoding region 440 can be designed so that only one of the first encoding segments 497a is marked white. Identifying and locating this mark relative to the rest of the target 150 will provide an initial indication of the roll 166 of the target 150 (i.e., it resolves the 4-way ambiguity inherent in the target 150). Precise determination of the roll 166 is determined from an analysis of other features of the target 150, such as the radial edge 360 boundaries of the spokes 510. The remaining encoding segments 497b, 497c, 497d of the encoding regions 440 can be used to establish a unique serial number for the target 150. The serial number would comprise a unique sequence of white and dark encoding segments 497b, 497c, 497d.

The encoding regions 440 are radially outward of the spokes 510 and circumferentially between the ODR regions 610.

Example

In one example, the front surface 280 of the target 150 is square and has edges of 40 mm (i.e., it is a 40 mm×40 mm square). The area of the front surface 280 (which will also be referred to as the "surface area of the target 150") is 1600 mm$^2$. The inner landmark circle 490 of the robust landmark 500 has a diameter of 28 mm (i.e., each spoke 510 has a radius 465 of 14 mm). The outer landmark circle 495 has a diameter of 31 mm (i.e., the radius 475 is 15.5 mm). The border 530 has a width of 1.5 mm. The area of the robust landmark 500 is about 754 mm$^2$. The robust landmark 500 is therefore about 77.5% of the width of the target 150 and occupies about 47% of the surface area of the target 150. In other embodiments, the area of the robust landmark 500 is at least 10%, 20%, or 30% of the total area of the target 150. In other embodiments, the width of the robust landmark 500 is at least 36%, 50%, or 60% the width of the target 150.

Another way to describe the size of the robust landmark 500 is to compare the area of the robust landmark 500 (i.e., 754 mm$^2$) to the area of the ODR regions 610. In the illustrated embodiment, the ODR regions 610 have an area of about 628 mm$^2$ for all four regions combined. As such, the ODR regions 610 have a combined area that is about 120% of the total area of the target 150. In other embodiments, the ODR regions 610 may have a combined area that is as low as 25% the total area, or at least 40% or 80% the total area of the ODR regions 610.

In an example system 110, a performance requirement might be that the target 150 must occupy an image region of no less than 40×40 pixels in order to be processed. The 40×40 pixel limitation dictates the minimum size of the starburst landmark 500 that will be readily detected for a given measurement volume and camera resolution. If the target is a 40×40 mm square, and the camera or imager has a resolution of 1000×1000 pixels, then the maximum working volume has a frontal area of 1 meter square. To increase the size of the working volume, either the target 150 must be made larger (bringing problems of attachment, weight, etc.) or the camera 130 must be higher resolution (bringing problems of cost, reduced frame rate, increased image processing).

Other RGR Target Design Considerations

Because of substrate 210 thickness and refraction, a feature on the rear surface 290 of the target 150 appears displaced relative to a feature at the same location on the front surface 280, unless viewed directly from the front of the target 150 along the z-axis 163. Because the robust landmark 500 in the illustrated target 150 is comprised of the front artwork 220 and the rear artwork 230, the robust landmark 500 includes features that appear to displace relative to each other as the target 150 is pivoted out-of-plane.

Each of the five landmarks 500, 450 in the target 150 will preferably have a uniform intensity difference along their perimeters to enable precision location. The grating regions 330, 420, by virtue of the moiré patterns, do not have uniform intensity, or a uniform intensity difference at their edge.

The target 150 combines at least a portion of the grating regions 330, 420 into a portion of the robust landmark 500. More specifically, the target 150 includes a portion of the grating regions 330, 420 into the interstitial spaces 520 of the robust landmark 500. This is a substantial improvement over the prior art target disclosed in U.S. Pub. No. 2010/00046857 because it permits a significant reduction of the required apparent target size, with associated benefits of larger working volume, lower weight targets, lower resolution cameras, reduced cost, higher speed and/or reduced image processing burden.

The inter-spoke regions of ODR-producing regions in the form of moiré patterns are generally wedge-shaped and are positioned circumferentially between the spokes 510 of the robust landmark 500. By virtue of this arrangement, the robust landmark 500 can be made much larger relative to the size of the target 150.

Operation

In operation, the target 150 can be readily located by the digital imaging and processing system 110, and used to determine the positioned and orientation of the target 150 (and the object on which the target 150 is attached). The following process is not intended to be limited to the specific order described below.

First, the robust landmark 500 is identified by looking for its unique configuration. Once identified, its x and y location can be easily determined by measuring x and y coordinates to the center 350 of the robust landmark 500.

Next, the target 150 is identified (if more than one target 150 is used) by locating and analyzing the identification markings or encoding segments 497a, 497b, 497c, 497d. These markings can also be used to resolve the 4-way ambiguity of the target 150, as noted above. Precise determination of the roll 166 (in-plane rotation) of the target 150 can be determined by analyzing the position and orientation of the radial-edge boundaries 360.

The ODR regions 610 of the target 150 are then identified and analyzed. Due to the change in radiation of the moiré patterns as a function of its orientation, analysis of the ODR regions 610 will provide an indication of the out-of-plane rotation of the target 150. Cosine ambiguity can be addressed by comparing front-surface marking (e.g., the radial-edge boundaries 360) to back-surface markings (e.g., the circumferential-edge boundaries 460), as described above.

Finally, the secondary landmarks or locatable features 450 are located and measured to determine the z-coordinate of the target 150 relative to the camera 130.

Thus, the invention provides, among other things, a target having ORD regions that occupy at least a portion of the area of a robust landmark area. This permits the ratio of robust landmark size to target size to be maximized. Various features and advantages of the invention are set forth in the following claims.

What is claimed is:

1. A target for use in a system for optical tracking of motion of an object to which the target is affixed, the target comprising:
    an optically transparent substrate having a front surface and a rear surface;
    front artwork applied to the front surface of the substrate;
    rear artwork applied to the rear surface of the substrate;
    a robust landmark comprising of an image of the front and rear artwork, the robust landmark including a circular border defining an area of the robust landmark, and alternating spokes and interstitial spaces within the circular border; and
    orientation dependent radiation regions occupying at least a portion of the interstitial spaces of the robust landmark.

2. The target of claim 1, wherein the orientation dependent radiation regions extend radially outside of the robust landmark.

3. The target of claim 1, wherein the spokes and interstitial spaces are generally wedge-shaped.

4. The target of claim 1, wherein the spokes are defined by a first feature in the front artwork and a second feature in the back artwork.

5. The target of claim 4, wherein the first feature comprises a radial-edge boundary and the second feature comprises a circumferential-edge boundary.

6. A target comprising:
    an optically transparent substrate;
    an orientation dependent radiation region positioned on the substrate;
    a robust landmark positioned on the substrate; and
    at least one target identification marking that is rotationally oriented relative to the target in order to provide in-plane rotation information.

7. The target of claim 6, wherein the orientation dependent radiation region comprises two orientation dependent radiation regions, and wherein the target identification marking is positioned between the two orientation dependent radiation regions.

8. The target of claim 7, wherein the target identification marking is positioned outside of the robust landmark and circumferentially between the orientation dependent radiation regions.

9. The target of claim 6, wherein the robust landmark includes a spoke, and wherein the target identification marking is positioned radially outward from the spoke.

10. The target of claim 6, wherein the target identification marking comprises a plurality of markings that provide multi-bit identification.

11. The target of claim 6, wherein the target identification marking comprises sixteen possible markings that provide 16-bit identification.

12. A target comprising:
a substrate having a total area;
an orientation dependent radiation region positioned on the substrate, the orientation dependent radiation region providing a shape or pattern that can be interpreted to refine an approximate estimate of out-of-plane tilt of the target; and
a robust landmark positioned on the substrate, the robust landmark being an object whose image has at least one detectable property that does not change as a function of viewing angle, the robust landmark having a landmark area that is at least 10% of the total area.

13. The target of claim 12, wherein the landmark area is at least 20% of the total area.

14. The target of claim 12, wherein the landmark area is at least 30% of the total area.

15. The target of claim 12, wherein the landmark area is about 47% of the total area.

16. A target comprising:
a substrate having a substrate width;
an orientation dependent radiation region positioned on the substrate, the orientation dependent radiation region providing a shape or pattern that can be interpreted to refine an approximate estimate of out-of-plane tilt of the target; and
a robust landmark on the substrate, the robust landmark being an object whose image has at least one detectable property that does not change as a function of viewing angle, the robust landmark having a landmark width;
wherein the landmark width is at least 36% of the substrate width.

17. The target of claim 16, wherein the landmark width is at least 50% of the substrate width.

18. The target of claim 16, wherein the landmark width is at least 60% of the substrate width.

19. The target of claim 16, wherein the landmark width is about 77.5% of the substrate width.

20. A target comprising:
a substrate having a substrate width;
an orientation dependent radiation region positioned on the substrate, the orientation dependent radiation region providing a shape or pattern that can be interpreted to refine an approximate estimate of out-of-plane tilt of the target, the orientation dependent radiation region having an ODR area; and
a robust landmark on the substrate, the robust landmark being an object whose image has at least one detectable property that does not change as a function of viewing angle, the robust landmark occupying a landmark area;
wherein the landmark area is at least 25% of the ODR area.

21. The target of claim 20, wherein the landmark area is at least 40% of the ODR area.

22. The target of claim 20, wherein the landmark area is at least 80% of the ODR area.

23. The target of claim 20, wherein the landmark area is at least 120% of the ODR area.

24. A target comprising:
a substrate; and
orientation dependent radiation regions positioned on the substrate, the orientation dependent radiation region providing a shape or pattern that can be interpreted to refine an approximate estimate of out-of-plane tilt of the target;
wherein the orientation dependent radiation regions are generally wedge-shaped.

25. The target of claim 24, further comprising a robust landmark that includes spokes that define a center of the target; wherein the orientation dependent radiation regions are spaced circumferentially relative to the center.

26. The target of claim 25, wherein the orientation dependent radiation regions extend radially further than the spokes of the robust landmark.

27. The target of claim 25, wherein the spokes are generally wedge-shaped.

28. A target for use in a system for optical tracking of motion of an object to which the target is affixed, the target comprising:
an optically transparent substrate having a front surface and a rear surface, both the front surface and rear surface being parallel to a plane;
front artwork applied to the front surface of the substrate;
rear artwork applied to the rear surface of the substrate; and
a robust landmark comprising an image of the front and rear artwork;
wherein portions of the front artwork and rear artwork included in the robust landmark appear to move with respect to each other in an image of the target having been tilted about an axis within the plane, such that a direction of tilt of the target can be determined from the apparent relative movement of the portions of the front artwork and rear artwork.

* * * * *